United States Patent [19]

Tuzson

[11] 4,287,975
[45] Sep. 8, 1981

[54] CLUTCH WITH FUSIBLE MATERIAL AS PROTECTIVE ELEMENT

[75] Inventor: John J. Tuzson, Evanston, Ill.

[73] Assignee: Borg-Warner Corporation, Chicago, Ill.

[21] Appl. No.: 112,673

[22] Filed: Jan. 16, 1980

[51] Int. Cl.³ .......................... F16D 43/25; F16D 9/00
[52] U.S. Cl. ..................................... 192/82 T; 64/28 R
[58] Field of Search ...................... 192/82 T; 64/28 R

[56] References Cited

U.S. PATENT DOCUMENTS

| | | | |
|---|---|---|---|
| 2,224,440 | 12/1940 | Lewis | 192/82 T X |
| 2,314,227 | 3/1943 | Lieberherr | 192/82 T |
| 2,655,015 | 10/1953 | Linder | 192/82 T |
| 2,825,437 | 3/1958 | Reykjalin | 192/105 |
| 3,064,454 | 11/1962 | Sharples | 192/82 T |
| 3,193,068 | 7/1965 | Greve et al. | 192/82 T |
| 3,212,613 | 10/1965 | Carlson | 192/82 T X |
| 3,972,399 | 8/1976 | Bopp | 192/82 T |

FOREIGN PATENT DOCUMENTS 510000 10/1930 Fed. Rep. of Germany .... 192/82 T

Primary Examiner—Allan D. Herrmann
Attorney, Agent, or Firm—Florian S. Gregorczyk

[57] ABSTRACT

A clutch is disclosed with at least two engaging surfaces and a friction lining between the surfaces. Interposed between the friction lining support member and a driven member is a fusible, low melting point material, which can be an alloy or an element. At an elevated clutch temperature, dependent upon the melting temperature of the selected material, the material will melt and allow the driven member to slip or freely rotate relative to the driving member. The material solidifies upon cooling below its melting temperature, and thereby allows the clutch to engage and function in its usual manner with no maintenance or repair.

6 Claims, 2 Drawing Figures

CLUTCH WITH FUSIBLE MATERIAL AS PROTECTIVE ELEMENT

BACKGROUND OF THE INVENTION

The invention relates to a clutch mechanism with at least two contacting clutch surfaces, that is, a driving and a driven surface, with a meltable, fusible material interposed between either clutch lining face and its supporting structure to allow slippage in the event of an overtemperature condition. Present dry and wet type clutches include two engaging surfaces, a driven and a driving surface. In a typical clutch application, such as in an automobile drive train, the clutch consists of three basic elements. The driving face is attached or connected to the engine crankshaft, and revolves with it. A driven face is attached to a cover or housing which is bolted to the flywheel. The disc (the third clutch element) is squeezed between the driven and the driving surfaces during engagement of the clutch. At clutch engagement a certain amount of heat is generated. The rate of heat generation during engagement varies with the torque capacity of the clutch and the length of engagement time.

Dry clutches, that is, clutches not operating in a fluid environment, are not particularly susceptible to damage from the heat generation rate as they incorporate large heat sinks in the masses of their pressure plate and the engine flywheel. However, a dry clutch is susceptible to damage from the total amount of heat generated. All the heat in a dry clutch must be transferred to the surrounding air; therefore the time from engagement to lockup should be as short as possible. Wet clutches, that is, clutches cooled by oil or some other fluid, are more susceptible to damage from a high rate of heat generation, rather than from seeing a lower heat level for a long period of time during a clutch engagement cycle.

Heat affects every factor influencing a clutch assembly and its concomitant torque capacity. Heat causes mating surface warpage and dishing, and results in a dimensional shift of the effective mean radius of the clutch. The dishing can also cause a much higher rate of friction material wear as the mating surfaces will no longer make full contact, and torque capacity of the clutch will be reduced as the plate contact point moves and affects the effective mean radius. The coefficient of friction of the clutch facing material can change due to excessive heat and thereby cause the friction surface to break down and wear rapidly. Heat affects the effective number of active friction surfaces by causing warpage, uneven contact of the mating surfaces and generation of hot spots and premature failure of some plates. In addition, heat tends to remove the temper from springs thereby decreasing clamping force. Thus it is desirable to reduce the potential danger from heat generated during clutch engagement or from excessive slippage. One approach is to reduce clutch engagement time, but this adds to the shock load and potential damage hazard to the clutch and associated parts of the drive train, as well as being a discomfort to the operator.

It is apparent that clutch temperature is related to and generally increases with the energy dissipated by the clutch. It is known that during clutch operation the highest temperature is attained at the end of a range shift. Various devices have protected the connecting mechanical means of a drive system from damage due to excessive heat, torque or shearing forces. Examples of such devices are shear pins, meltable material requiring a replacement after use, a fracturable fusible material, or a combination of a fusible material with a mechanical shear pin. However, it is readily apparent that a shear pin is a unifunctional element, that is, it requires replacement after having performed its protective function. This can lead to the problem of replacement of a pin of the requisite size and material, as both characteristics can influence the load bearing potential of a shear pin. In the case of a meltable connecting material which is heat responsive and flows away from the mechanism, the same or similar problem obtains, that is, replacement of the material of the same composition and of the proper quantities required at the precise location within the mechanism.

It is thus an important object of the invention to provide a protective coupling device or mechanism that is heat responsive, and which does not require replacement after each use. Any protective device or mechanism for a clutch lining should operate in the range of about 350° F. to 500° F. to prevent slippage below 350° but to protect from irreversible heat damage above about 500° F.

A related object of the invention is to provide such a protective device or mechanism which allows protection of the engaging surfaces by affording controlled slip at excessive temperatures.

SUMMARY OF THE INVENTION

This invention, in a preferred embodiment, includes a clutch having a driving annular plate and a driven annular plate positioned for selective engagement with, and disengagement from, the driving plate. Each of the plates has a surface oriented toward an opposed surface on the other plate. A friction lining material is affixed to one surface, and a meltable, fusible material (an alloy or an element) is interposed between the friction lining material and its supporting structure. The meltable fusible material has a melting point such that it undergoes a transition from the solid state to the liquid state when the cluth reaches an elevated temperature, allowing the driven plate to slip with respect to the driving plate and thus prevent damage to the friction lining material. Upon cooling the assembly reforms to its original state.

BRIEF DESCRIPTION OF THE DRAWING

In the figures of the drawing, like reference numerals identify like components, and in the drawing.

DETAILED DESCRIPTION OF THE INVENTION

Figure 1:
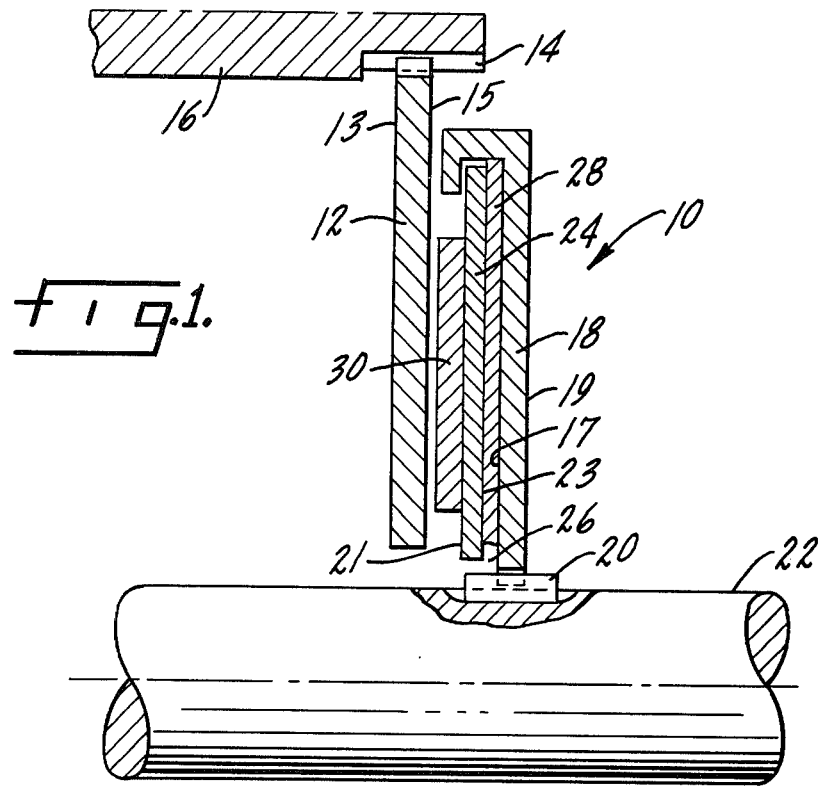
FIG. 1 is a sectional view of a simple clutch showing the connection from the driving member through the driven shaft by two plates, a friction lining and an interpositioned low melting alloy.

Referring first to FIG. 1, a clutch assembly 10 is shown with a driving plate 12 with face 13 and obverse 15 connected by a spline 14 to an annular driving member 16, driven from a power source (not shown). A first driven annular plate 18 with face 17 and obverse face 19 is drivingly connected by a key or spline 20 to a driven shaft 22. A second driven annular plate 24 with face 21 and obverse face 23 is located parallel to the plane of the first plate 18, and is free to rotate with respect to plate 18. Plates 18 and 24 define a gap 26 in which a meltable and fusible low-melting point material 28 is positioned. This material does not fill the gap 26. Affixed to face 21 of second plate 24 obverse from low melting point material 28 is a conventional friction lining material 30, such as asbestos-impregnated paper. The friction lining material 30 is positioned to contact driving plate 12 upon clutch assembly 10 engagement.

Figure 2:
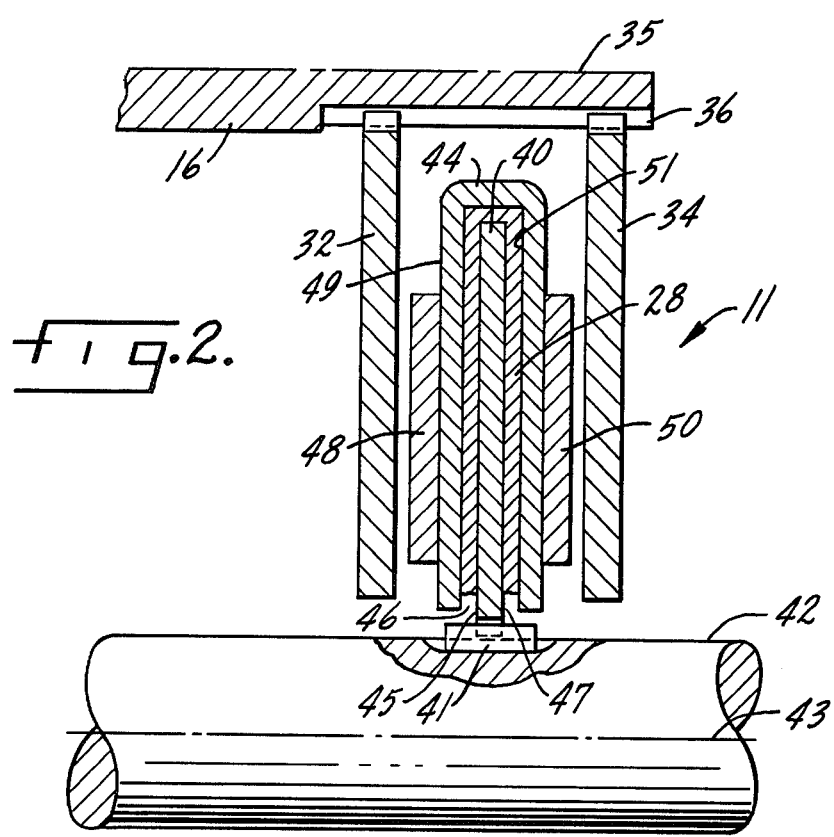
FIG. 2 is a sectional view of an alternative clutch arrangement, including a dual pressure plate with a clutch disc and dual lining as well as a low melting point alloy.

FIG. 2 indicates an alternative embodiment of the invention. A clutch assembly 11 has dual driven plates 32 and 34 positioned in parallel planes along and concentric with an axis 35 of a driving member 16, to which plates 32 and 34 are connected by a spline 36. A first driven annular plate 40 with faces 45 and 47 is keyed, splined or otherwise connected at position 41 to a driven member 42 in a plane perpendicular to the axis 43 of driven member 42. Disc plate 40 is interposed between dual driven plates 32 and 34, and is parallel to the planes of these plates. Mounted about first plate 40 is a second driven annular plate 44 with an external face 49 and internal face 51, formed in a U-shaped cross section and annular about first plate 40. The outside perimeter of plate 44 is such that the sides of the U form parallel faces to the faces of first plate 40. The U-sides are separated from first plate 40 by a gap 46, defined by the faces of plate 40 and internal face 51 of the U-shaped cross sectioned plate 44. The base or curved section of the U defines a similar gap at the outer perimeter of the first plate 40. Mounted on either side or leg of the U shaped cross section second plate 44 on the external face 49 are friction linings 48 and 50. These friction linings 48, 50 are parallel to the faces of driven plates 34 and 36, first plate 40, and the sides of U-shaped cross section plate 44. The linings 48 and 50 are positioned such as to contact pressure plates 34 and 36 at clutch engagement. Within gap 46 is a low melting point material 28.

In operation, at engagement of the clutch assembly 10 shown in FIG. 1, friction lining material 30 is in contact with driving plate 12. At engagement and lock-up driving member 16 and driven shaft 22 rotate. As the work load or torque load of clutch assembly 10 increases, the heat dissipated in clutch assembly 10 increases. There will generally be a heat build-up at the end of a shift range of the transmission (not shown) associated with the clutch assembly 10. The highest temperature generally will be attained at the friction lining 30. If the amount of heat being dissipated within clutch assembly 10 is such that it elevates the temperature of low melting point material 28 above its melting temperature, then second driven annular plate 24 with friction material 30 will rotate freely relative to first driven annular plate 18 and thereby avoid damage to friction lining material 30 due to overheating. Second plate 24 will continue to freely rotate until clutch assembly 10 cools sufficiently that the low melting point material 28 is again fused, at which time the first and second plates 18 and 24 again rotate together. Similarly in FIG. 2 upon temperature elevation of the clutch friction lining material 48, 50 above the melting point of the low melting point material, this material liquifies and plate 40 is then free to rotate with respect to the U-shaped cross section second plate 44. As the assembly 10 or 11 cools below the melting point of the low melting alloy 28, the assembly 10 or 11 recovers to its initial state with no external maintenance.

The low melting point material 28 is selected from materials with a melting point above about 350° F. and below about 500° F. The particular alloy or element selected will depend upon that temperature where permanent damage would otherwise result to the specific friction lining material being employed. One example of such a low melting point material is an eutectic fusible alloy of 67.75 weight percent tin (Sn) and 32.25 weight percent cadmium (Cd) with a melting temperature of 351° F. An example of a low melting point element is tin with a melting temperature of 449° F.

While only particular embodiments of the present invention have been shown and described, it is manifest that these are in no way limiting on the scope of the invention described and claimed herein.

I claim:

1. A clutch assembly having at least one driving plate, a first and second driven plate positioned for selective engagement with, and disengagement from, the driving plate, each of said plates having at least one face oriented toward an opposed face on another of said plates, a friction lining material affixed to one of said faces, and a meltable, fusible material interposed between said driven plates, said meltable, fusible material having a melting point such that it undergoes a transition from the solid state to the liquid state when the clutch assembly reaches a predetermined, elevated temperature, allowing the driven plate with the lining material affixed thereto to slip with respect to the second driven plate and prevent damage to the friction lining material.

2. A clutch assembly as claimed in claim 1, wherein said meltable, fusible material is a metal alloy.

3. A clutch assembly as claimed in claim 2, wherein said alloy has a melting point in the range of about 350° F. to 500° F.

4. A clutch assembly as claimed in claim 1, wherein said meltable, fusible material is an element.

5. A clutch assembly as claimed in claim 4, wherein said element has a melting point in the range of about 350° F. to 500° F.

6. A clutch assembly having at least two engaging surfaces, where one of the engaging surfaces is a driving surface and the other of the surfaces is driven, a friction material lining interposed between said engaging surfaces, and a meltable, fusible material interposed between said friction material lining and one of the engaging surfaces to protect the friction lining at elevated temperatures.

* * * * *